June 9, 1942. E. D. BAILEY 2,285,792
FRACTIONAL WAVE FILMS AND POLARIZING SYSTEMS CONTAINING THEM
Filed Dec. 13, 1939 3 Sheets—Sheet 1
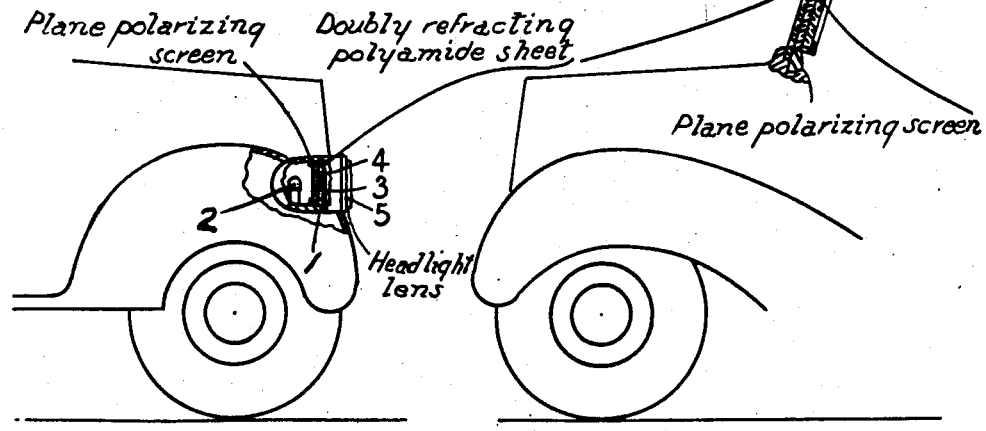
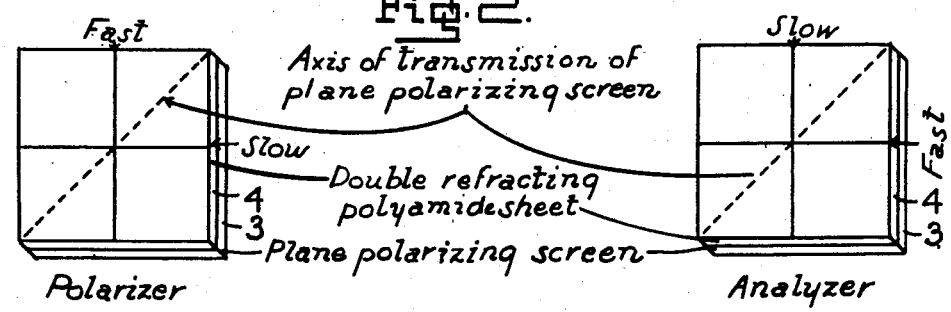
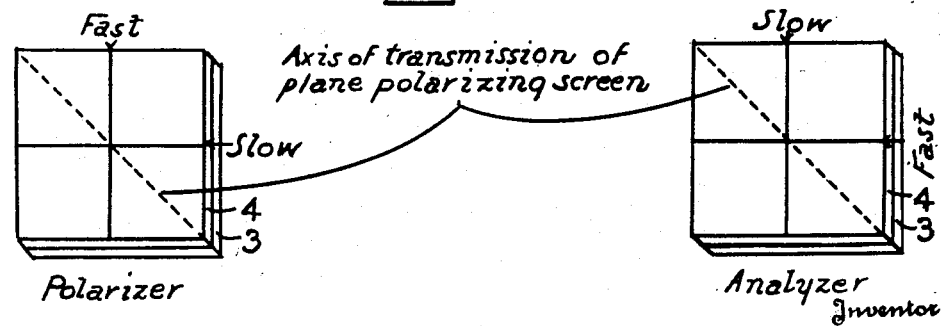
Inventor
Emerson D. Bailey
By R. F. Miller
Attorney

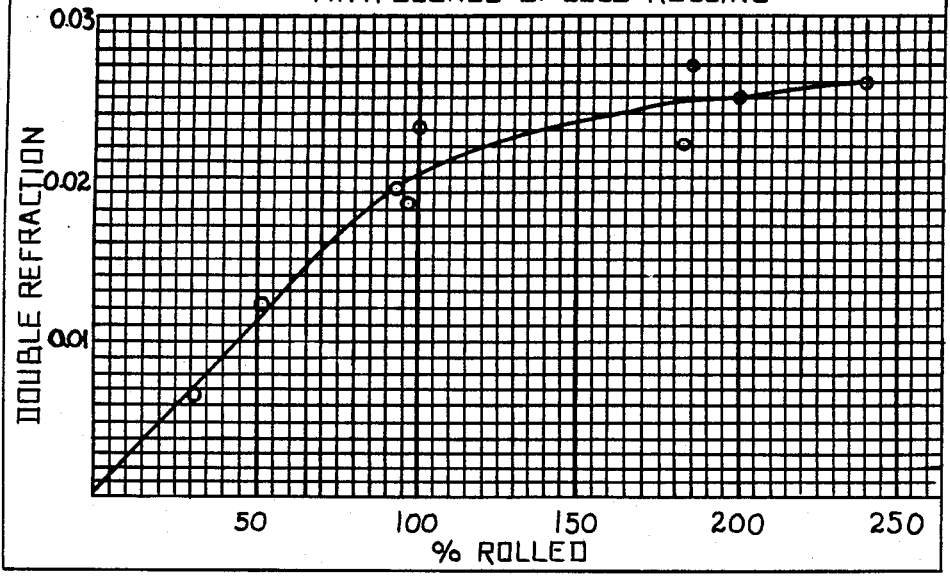
Fig. 4. VARIATION IN DOUBLE REFRACTION OF POLYAMIDE FILMS WITH DEGREE OF COLD ROLLING
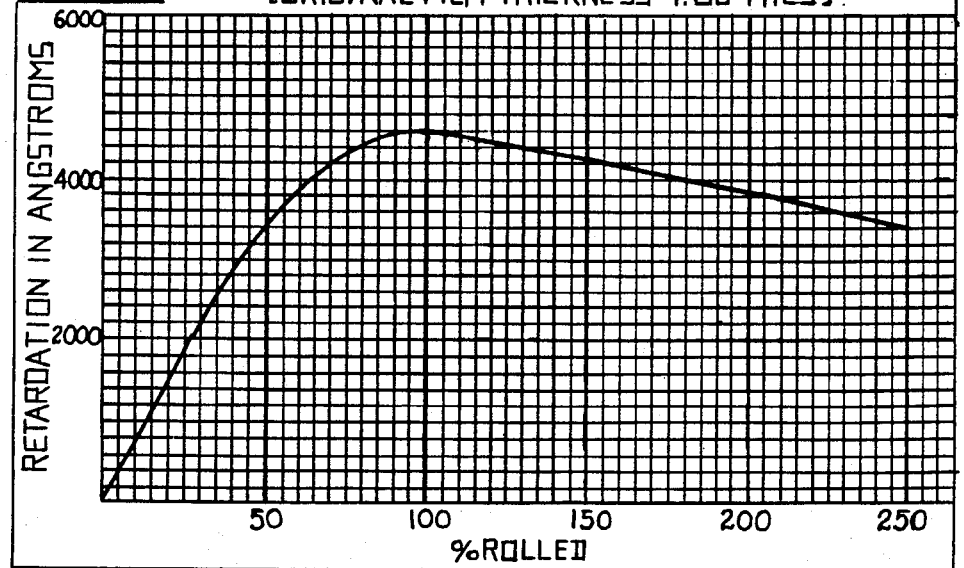
Fig. 5. VARIATION IN RETARDATION WITH COLD ROLLING [ORIGINAL FILM THICKNESS 1.80 MILS]
Inventor
Emerson D. Bailey
By A. F. Miller
Attorney June 9, 1942.   E. D. BAILEY   2,285,792
FRACTIONAL WAVE FILMS AND POLARIZING SYSTEMS CONTAINING THEM
Filed Dec. 13, 1939   3 Sheets—Sheet 3
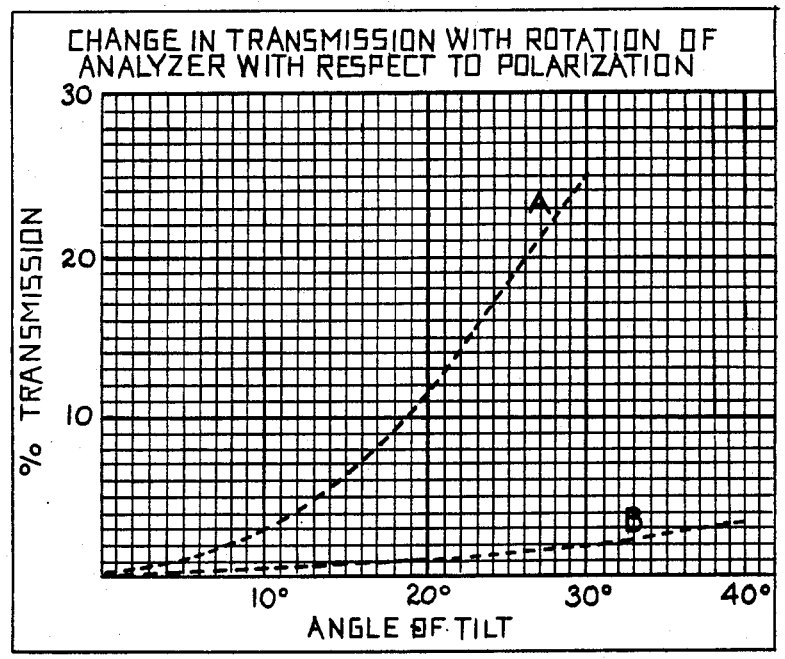
Inventor
Emerson D. Bailey
By A. F. Miller
Attorney Patented June 9, 1942

2,285,792

UNITED STATES PATENT OFFICE 2,285,792

FRACTIONAL WAVE FILMS AND POLARIZING SYSTEMS CONTAINING THEM

Emerson Dudley Bailey, Wilmington, Del., assignor to E. I. du Pont de Nemours & Company, Wilmington, Del., a corporation of Delaware Application December 13, 1939, Serial No. 309,079

11 Claims. (Cl. 88—65)

This invention relates to fractional wave retardation sheeting elements and more particularly to a system for changing the eccentricity of elliptically polarized light.

Recently "Cellophane" and other doubly refracting plastics have been used in place of mica or selenite as a means for changing the plane of polarized light. However, with all of the materials which have so far been used it has not been possible to prepare sheets with a predetermined degree of relative retardation, i. e., retardation of one of the two resolved perpendicular components with respect to the other.

This invention has as an object a new and improved system for changing the eccentricity of elliptically polarized light, and more particularly for obtaining circularly polarized light from plane polarized light. A further object is an improved fractional retardation sheeting element which overcomes the above mentioned disadvantages inherent in sheeting elements previously used for the same purpose. A further object resides in a method for manufacturing these sheeting elements. A further object of the invention is the production of a fractional wave retardation film from a polymeric material which is capable of continuous and automatic conversion to sheeting with any predetermined degree of fractional wave retardation. A further object is the application to automotive illumination, viewing systems and to other uses of the above mentioned sheeting element in conjunction with a polarizing screen. Other objects will appear hereinafter.

In the production of my improved fractional retardation sheeting element these objects are accomplished by means of a doubly refracting transparent sheet obtained by cold working, preferably cold rolling, a film or sheet of synthetic linear superpolymer to exactly the degree necessary to produce the required retardation of one of the mutually perpendicularly polarized components of the light transmitted by the sheeting with respect to the other. In the preferred embodiment the "cold rolling" or "cold drawing" is done in steps with automatic optical control between each step, which permits the production of continuous sheeting with any desired degree of optical retardation. The above objects with regard to the system for producing elliptically polarized light of any eccentricity are accomplished by associating or combining, preferably by lamination, the above mentioned doubly refracting polymer sheet with a plane polarizing screen or film.

The term "superpolymer" is used in the sense of a polymer capable of being formed into pliable fibers.

In the accompanying drawings the invention is illustrated in connection with automobile illumination wherein Fig. 1 illustrates an automobile headlight together with an analyzer on an approaching car, the headlight and analyzer both embodying my invention;

Figs. 2 and 3 show the relationship for each of two approaching cars of the polarizing screen and the doubly refracting polyamide sheet;

Fig. 4 is a graph showing the variation in double refraction of polyamide films with degree of cold rolling;

Fig. 5 is a graph showing the variation in retardation with cold rolling; and

Fig. 6 is a further graph showing the change in transmission of the circularly and elliptically polarized white light which occurs when the analyzer of my invention is rotated with respect to the polarizer.

In the above figures the numeral 1 indicates a conventional automobile headlight provided with a light source 2 and usual lens 5. Positioned in front of the light is my improved polarizer comprising the doubly refracting polyamide sheet and a plane polarizing screen 3 positioned adjacent to the polyamide sheet 4 and between that sheet and the light source. The analyzer as shown in Fig. 1 is composed of the polyamide sheet and a plane polarizing screen positioned between the polyamide sheet and the driver's eye. In Figs. 2 and 3 the numerals 3 and 4 likewise indicate the plane polarizing screen and doubly refracting polyamide sheet.

The doubly refracting polyamide sheet is obtained in the manner hereinafter pointed out from the synthetic linear superpolymers described in U. S. Patents 2,071,250, 2,071,253 and 2,130,948. The most useful of these polymers for the present purpose are the polyamides which are obtainable from either polymerizable monoaminomonocarboxylic acids or their amide-forming derivatives, from the reaction of diamines with dicarboxylic acids or amide-forming derivatives of dibasic carboxylic acids, or from mixtures of these two types of polyamide-forming reactants. It is to be understood that the term "polyamide" includes linear polymers containing other groups in addition to the recurring amide groups, as for instance the ester-amide interpolyamides obtained by including a glycol with a dibasic acid and a diamine. The amide groups in the polyamides form an integral part of the main chain of atoms in the polymers. Upon hydrolysis with mineral acids the polyamides revert to monomeric amide-forming reactants. For example, a polyamide derived from a diamine and a dibasic acid yields on hydrolysis with hydrochloric acid the dibasic acid and the diamine hydrochloride. In the case of the amino acid polymers the amino derivatives are obtained in the form of the hydrochloride.

The above mentioned polyamides, like the high molecular weight linear polymers in general, are remarkable in that they can be formed into filaments which upon application of tensile stress below the melting point, referred to as cold drawing, yield fibers exhibiting by characteristic X-ray patterns orientation along the fiber axis. Films and sheets, which may be obtained by extrusion from the molten polyamide, likewise exhibit orientation upon cold rolling or cold drawing. Cold rolling and cold drawing also improves the toughness, stiffness, modulus of elasticity and the tensile strength. Since both of these methods are equivalent for the present purpose, the methods of cold working applicable for producing orientation will be referred to as cold rolling, which in the case of films is somewhat the more convenient method of producing orientation. In general the polyamides should have an intrinsic viscosity of at least 0.4, and preferably above 0.6, as defined in the last mentioned patent, in order to obtain the desired orientation through cold rolling. The polyamides, in common with other fiber-forming synthetic linear condensation polymers, are microcrystalline in character as evidenced by their sharp melting point and the nature of the diffraction pattern which they furnish on X-ray examination.

As has been previously mentioned the present invention is concerned with an improved system for changing the eccentricity of elliptically polarized light and particularly for obtaining circularly polarized light from plane polarized light and vice versa. All polarized light will be considered as elliptically polarized, plane and circularly polarized light being special cases where the eccentricities of the ellipse are 0 and 1, respectively.

I have found that the properties of high linear extension at ordinary temperatures and the ability of the synthetic linear polymer films to be oriented by cold rolling are particularly valuable in the production of exact fractional wave films. This ability to modify the retardation in the solid state in the absence of solvent makes it possible to observe the amount of retardation immediately after the modification has taken place and makes possible the automatic production of films with a predetermined degree of retardation by rolling in a series of steps followed by optical observation after each step, the observation and pressure control on the rolls being preferably automatic. The production of the doubly refracting linear polymer sheet used in the practice of this invention requires a practically absolute uniformity in thickness throughout the sheet that is not obtained without special precautions which includes the exercise of unusual care in preparation and in rolling of the films, as for instance by forming the film from accurate extrusion slots and by cold rolling with rolls of extreme uniformity. In order to insure the uniform production of clear films, the films obtained from the molten polymers are preferably tempered by rapid chilling before they are cold rolled. For this purpose the polymer can be extruded as a sheet into a cooling atmosphere, onto a cooled drum, or into a suitable quenching liquid such as water or other inert non-solvent for the polymer.

The following is a specific example of the preparation of my improved fractional wave retarding element:

A ribbon of polyhexamethylene adipamide 1.8 mils in thickness was prepared by extruding the molten polymer onto the surface of an internally cooled casting wheel from an orifice placed approximately ¼" from the surface of the casting wheel. This ribbon was cold rolled exactly 24.2%, i. e., to 124.2% of its original length, and the retardation measured with a polarizing microscope equipped with a Berek compensator. The retardation was found to be just 1800 Å. units or one-quarter wave of green light.

A series of ribbons of the polyamide in the foregoing example, which were prepared by extruding the molten polymer onto the surface of an internally cooled casting wheel so as to give different thicknesses of film, were cold rolled to different degrees and the double refraction of these films were measured. Table I below shows the original thickness of the film, the degree of cold rolling, and the measured double refraction. Fig. 4 shows double refraction as a function of cold rolling, and Fig. 5 shows the variation in retardation of a film originally 1.8 mils in thickness with cold rolling. From these data it is evident that any desired degree of fractional wave retardation can be obtained. It is further evident that the double refraction developed by cold rolling is independent of the original film thickness.

TABLE I

Variation in double refraction of polyamide films with degree of rolling

| Sample | Original thickness | Per cent rolled | Double refraction $(n'-n'')$ |
|---|---|---|---|
| | Mils | | |
| 1 | 4.5 | 31 | .0066 |
| 2 | 1.8 | 51 | .0122 |
| 3 | 1.8 | 92 | .0193 |
| 4 | 0.9 | 96 | .0184 |
| 5 | 4.5 | 100 | .0231 |
| 6 | 4.5 | 180 | .0271 |
| 7 | 1.8 | 182 | .0233 |
| 8 | 1.6 | 200 | .0251 |
| 9 | 4.6 | 240 | .0260 |

The required retardation is a function not only of the thickness of the polymer film but also of the degree of cold rolling. This relationship is expressed by the equation $\lambda = T(n'-n'')$ where $\lambda$ represents the retardation in wave lengths expressed in cm., $n'-n''$ represents the double refraction of the film, and $T$ represents the thickness of the film in cm. In films of synthetic linear superpolymers the degree of cold rolling determines the degree of molecular orientation which in this case is primarily parallel orientation of the molecules in the same plane, the orientation being in the direction of rolling. When white light is transmitted through the polarizing screen to the polymer sheet the cold rolling is carried to such extent that the retardation is an eighth wave or multiple thereof for green light, and in the most valuable embodiment of the invention is one-fourth wave in which case circularly polarized light is obtained for the green light by placing the axis of transmission of the plane polarizing screen at an angle of 45° to the principal optical axis of the doubly refracting polymer sheet. With a different light source, as for instance a predominantly monochromatic light such as sodium light, the degree of cold rolling is such that the retardation is an eighth wave or multiple thereof for the light transmitted, circularly polarized light being obtained by placing the axis of transmission of the plane polarizing screen at the proper angle with the principal axis of the doubly refracting polymer sheet and making the retardation ¼ wave of the radiation.

In Figs. 2 and 3 are indicated the fast and slow axes of the doubly refracting polyamide film and the axis of transmission of the polarizing screen. It is only when the elements are positioned as in Figs. 2 and 3 in which case the plane of the incident light makes an angle of 45° with the optic axis of the polyamide film that plane polarized light can be converted to circularly polarized light. With suitable orientation of the incident light to the axis of the plate and the proper retardation of the plate it is evident that any modification of elliptically polarized light may be obtained from either circularly or elliptically polarized light and also that circularly polarized light may be converted to plane-polarized light by a quarter-wave retardation film.

When, as in automotive illumination, white light i. e., light covering a band of wave lengths, is used, only one wave length in this band can be accurately converted into circularly polarized light; light of all other wave lengths being converted to elliptically polarized light. In the automotive use the most important feature of circularly polarized light is the fact that the degree of extinction or transmission is not changed when the relative orientation of polarizer and analyzer is changed. This means that two cars approaching each other equipped with circularly polarizing headlamps and analyzers will receive the same degree of anti-glare protection regardless of the tilt of either car. The extinction obtained with the circular-elliptical light resulting from the use of a retardation film with white light is changed with changes in orientation of polarizer and analyzer but the change is very small compared to that obtained with plane polarized light.

In Figs. 2 and 3 four different relationships are shown between plane polarizing film and a retardation film. For the present analysis it will be considered that monochromatic light is used, and that in all cases the light comes from behind the plane of the paper and passes first through the plane polarizing screen and then through the retardation film which is quarter wave for the monochromatic illumination chosen. In the section to the left (polarizer) in A the vector will rotate clockwise, in the section to the right (analyzer) the vector will rotate counter-clockwise; in the section left (polarizer) in B the vector will rotate counter-clockwise, and in the section to the right (analyzer) in B the light will rotate clockwise. The clock is assumed in all cases to face the reader.

For analysis of the case of elliptically polarized light it will be assumed that the light comes from behind the paper in the case of the polarizer in Figs. 2 and 3, passing first through the plane polarizing film and then through the retardation film. In the analyzer it will be assumed that the light comes from in front of the paper, passes first through the retardation film and then through the plane polarizing film. If the orientation is as shown elliptically polarized light from the polarizer in Fig. 2 will be completely extinguished by analyzer of Fig. 3 because the retardation introduced by the retardation film in the polarizer will be cancelled by the retarding film of the analyzer in Fig. 2. If the relative orientation is disturbed the elliptically polarized light received by the analyzer in Fig. 2 can be divided into two components; in the first component the retardation will be cancelled and all the light extinguished; in the second component the axis of the ellipse will be rotated through 90° and the light given an additional retardation equal to that it received in the polarizer. This will result in elliptically polarized light from the second component striking the plane polarizing screen of the analyzer. The major axis of the ellipse will be at right angles to the axis of complete transmission of the screen provided the retardation does not depart too greatly from the quarter-wave. In a more complete analysis it is shown that if the retardation films are made quarter wave for 5800 A., i. e., light of $5.8 \times 10^{-5}$ cm. wave length, this condition is fulfilled. In this analysis the total visual energy transmitted from black body radiation of 2300° K. for various relative orientations of polarizer and analyzer has been calculated and the results are compared in Fig. 6 with the case of plane polarized light. The horizontal scale gives angle of tilt, i. e., rotation in the plane of Figs. 2 and 3 of the analyzer with respect to the polarizer. It is evident that the use of the retardation film gives a very greatly increased anti-glare protection.

The plane polarized light may be transmitted to the polyamide film by any suitable means. When, as in the most practical application of the invention the polyamide sheet is associated or combined with a plane polarizing device, this device may be of any of the usual materials as for instance finely divided herapathite incorporated and oriented in a plastic film, crystal calcite cut in the form of a Nicol prism, or a series of glass plates oriented at the proper angle with respect to the axis of the light beam, etc., and it may desirably be the improved plane polarizing screen described in application Serial No. 232,684, filed September 30, 1938, by M. M. Brubaker and myself.

Although this invention has been described with particular reference to the polyamides, it is applicable in general to the fiber-forming synthetic linear polymers described in mentioned U. S. Patent 2,071,250. Examples of such polymers are polyesters, polyureas, polythioureas, polyanhydrides, polyacetals, polyurethanes, polyethers, polyamide-polyesters, and other copolymers. The polyamides, and particularly those of the diamine-dibasic acid type, are usually preferred. For examples of further specific polyamides suitable for the present purpose reference may be had to the previously mentioned U. S. patents.

In addition to use in connection with automotive illumination this invention is also useful for three dimensional motion pictures, window displays, polarizing microscopes, and other laboratory equipment.

The present invention presents several marked advantages over materials such as cellulose derivatives, mica and crystal quartz, previously used for fractional wave retardation for the reason that the degree of retardation in the crystalline synthetic linear superpolymers can be altered at ordinary temperature. This fact makes it possible to cold-roll in steps with suitable optical control between the steps and to produce automatically fractional wave retardation films with any predetermined degree of retardation. The high melting point of the doubly refracting film described herein enhances its value for many purposes and is particularly valuable in automobile headlights where the films are subject to considerable heat radiation. The present product is in addition characterized by the desirable properties of fire resistance, slow dimensional changes on exposure to humidity, great strength, high tear resistance, resistance to weathering, and better aging qualities with consequent greater permanency than films now used for like purposes.

As many apparently widely different embodiments of this invention may be made without departing from the spirit and scope thereof, it is to be understood that I do not limit myself to the specific embodiments thereof except as defined in the appended claims.

I claim:

1. A fractional wave retardation element comprising a doubly refracting synthetic linear superpolymer film of practically absolute uniformity in retardation which has been permanently extended under stress in the solid state until the product of its double refraction and its thickness in cm. is equal to $$\frac{X}{8}$$

wave length, where X is an integer for light of a predetermined wave length expressed in cm.

2. The fractional wave retardation element set forth in claim 1 in which said superpolymer is a polyamide.

3. A system for converting natural light to elliptically polarized light comprising a device for producing plane polarized light and associated with said device a double refracting synthetic linear superpolymer film of practically absolute uniformity in thickness which has been permanently extended under stress in the solid state until the product of its double refraction and its thickness in cm. is equal to $$\frac{X}{8}$$

wave length, where X is an integer for light of a predetermined wave length expressed in cm.

4. The system set forth in claim 3 in which said superpolymer is a polyamide.

5. In the manufacture of a fractional wave retardation sheeting, the steps comprising cold working in the solid state a synthetic linear superpolymer film to a degree of permanent linear extension, molecular orientation and uniform thickness such that the product of its double refraction and its thickness in cm. is equal to $$\frac{X}{8}$$

wave length, where X is an integer, for light of a predetermined wave length expressed in cm.

6. In the manufacture of a fractional wave retardation sheeting, the steps comprising rolling in the solid state a synthetic linear superpolymer with consequent permanent linear extension and increase in molecular orientation and decrease in thickness, observing with an optical device the retardation of a selected plane polarized light transmitted through the film, and continuing said rolling in steps with each step followed by optical observation until the film has been permanently elongated and molecularly oriented to the extent at which the product of the double refraction of the film and its thickness in cm. is equal to $$\frac{X}{8}$$

wave length, where X is an integer, for light of the selected wave length expressed in cm.

7. The fractional wave retardation element set forth in claim 1 in which X is 2.

8. The fractional wave retardation element set forth in claim 1 in which X is 4.

9. The fractional wave retardation element set forth in claim 1 in which said predetermined wave length is $5.8 \times 10^{-5}$ cm.

10. The manufacture set forth in claim 5 in which said superpolymer is a polyamide.

11. The manufacture set forth in claim 6 in which said superpolymer is a polyamide.

EMERSON DUDLEY BAILEY.